United States Patent Office 3,105,024
Patented Sept. 24, 1963

3,105,024
CATALYTIC OLEFIN POLYMERIZATION METHOD
Henry G. Schutze, Albert T. Watson, and Andrew D. Suttle, Jr., Baytown, Tex., assignors, by mesne assignments, to Esso Research and Engineering Company, Elizabeth, N.J., a corporation of Delaware
No Drawing. Continuation of application Ser. No. 703,483, Dec. 18, 1957. This application Dec. 10, 1959, Ser. No. 858,562
18 Claims. (Cl. 204—162)

This invention relates to a process for the polymerization of olefins. More particularly, this invention is directed to a process for the preparation of normally solid high molecular weight polymers of alpha olefins.

This invention is a continuation of application Ser. No. 703,483, filed December 18, 1957, entitled "Olefin Polymerization Process," which is, in turn, a continuation-in-part of application Ser. No. 538,518, filed October 4, 1955, and entitled "Catalyst and Process for Preparing and Using the Same," both now abandoned.

In accordance with the present invention, an active alpha olefin polymerization catalyst is prepared by irradiating a solution of titanium halide in an unbranched aliphatic solvent with ionizing radiation of an energy sufficient to generate ion pairs for a period of time sufficient to at least partially reduce the titanium halide to a solvent insoluble condition whereby a suspension of finely divided titanium subhalide in the solvent is provided. The thus-prepared suspension may be utilized for the polymerization of alpha olefins by introducing such olefin into the polymerization medium in gaseous or liquid condition or as a solution in an unbranched aliphatic solvent. For maximized yield, the polymerization medium is irradiated with high energy ionization radiation of an intensity sufficient to generate useful numbers of ion pairs during the course of the polymerization reaction.

The starting materials for the present invention are titanium halides (i.e., titanium tetrachloride, titanium tetrabromide, etc.). In order to prepare the polymerization catalyst composition of the present invention, the titanium halide is dissolved in an unbranched aliphatic solvent such as a normal $C_5$ to $C_{16}$ paraffin or an unsubstituted cycloparaffin (i.e., naphthene). Thus, for example solvents such as n-pentane, n-hexane, n-heptane, n-octane, n-decane, n-dodecane, n-tetradecane, cetane, etc., cyclopentane, cyclohexane, cycloheptane, cyclooctane, etc. may be utilized. Mixtures of two or more such solvents and mixtures of two or more such titanium halides may be utilized, if desired.

A suitable solution of titanium halide and unbranched aliphatic solvent, such as a solution of about 0.2 to about 10 weight percent of titanium halide in solvent is irradiated to produce the catalyst composition of the present invention. The solution should be substantially completely free from water, oxygen, and extraneous compounds having substantial polarity. Accordingly, when necessary, the solvent may be purified for the removal of such contaminants by any suitable means such as, for example, by refluxing the solvent over metallic sodium, calcium hydride, or a similar agent and subsequently distilling the same in an inert atmosphere such as nitrogen, argon, neon, helium, etc., whereby any water, oxygen, or extraneous compound having substantial polarity which may have been initially present in the solvent is removed.

A solution of the above-described character is then irradiated in an inert atmosphere with radiation of an energy sufficient to generate ion pairs for a period of time sufficient to at least partially reduce the titanium halide. In general, the titanium halide will be reduced by at least one superficial valence state. The sufficiency of radiation may be determined, if necessary, through the use of a suitable radiation detector. Thus, for example, there may be used a Bubble Counter of the type disclosed by D. A. Glaser and D. C. Rahm in an article entitled "Characteristics of Bubble Chambers" (Physical Review, vol. 97, No. 2, January 15, 1955, pp. 474 to 479) wherein a superheated sample of a solution of the present invention may be irradiated. If the radiation is sufficient, ion pairs will be formed and at least some of the ion pairs will serve as nucleating agents for the superheated solution, whereby bubbles will be formed along the paths of travel of such ion pairs. Various forms of ionizing radiation may be used including, for example, high energy electrons, beta rays, gamma rays, Bremsstrahlung, X-rays, alpha particles, tritons, deuterons, protons, neutrons, the various mesons and hyperons and also recoil entities of nuclear fission, fusion and spoilation reactions. In many instances it is desirable that the radiation have an intensity sufficient to provide an energy input of from about 0.5 to about 5,000 watt hours of radiation per kilograms of solution during a period of about 0.1 to about 10 hours. It is frequently preferable to provide an energy input of from about 5 to 500 watt hours of radiation per kilogram of solution.

The nature of the reduction product that is obtained is not completely understood. Thus, for example, when titanium tetrachloride is reduced, the solvent insoluble product is a brown precipitate having a characteristic X-ray diffraction pattern which is different from the characteristic X-ray diffraction pattern of the well-known and accurately described purple $TiCl_3$. Moreover, when the precipitate is mildly ignited under vacuum, the decomposition products that are obtained consist of violet titanium trichloride and a liquid material. However, a solution of the precipitate in hydrochloric acid yields a material having the same absorption spectrum as that obtained when violet $TiCl_3$ is dissolved in the same solvent.

The irradiation reduction reaction may be conducted at any desired temperature, although temperatures within the range of about $-150°$ to about $+200°$ F. are preferably employed. Although higher or lower temperatures may be employed, if desired, temperatures above about $500°$ F. are not desirable.

The thus-prepared suspension of reduction product in unbranched aliphatic solvent comprises a reaction medium for the polymerization of alpha olefins. A wide variety of alpha olefins may be utilized alone or in admixture. Thus, for example, $C_2$ to $C_{16}$ alpha olefins such as ethylene, propylene, butene-1, butadiene, pentene-1, hexene-1, 2-methyl-pentene-1, heptene-1, 3-ethylpentene-1, 2,3-dimethylpentene-1, octene-1, nonene-1, decene-1, dodecene-1, cetene-1, 1,3-pentadiene, 1,5-hexadiene, 3-ethylpentadiene-1,3, etc. and mixtures thereof may be utilized. The polymerization reaction may be conducted at any desired temperature such as, for example, a temperature within the range of about $-100°$ to about $+250°$ F. Satisfactory polymerization is obtainable at room temperature. In general, it is preferable to employ a polymerization temperature in excess of about $40°$ F.

Although the suspension of reduction product in solvent prepared by the irradiation treatment may be used directly as a polymerization catalyst without further irradiation, it is preferable to irradiate during the polymerization reaction with irradiation of an energy sufficient to generate ion pairs in useful numbers. Thus, the catalyst composition is highly active immediately after preparation but tends to lose its activity at a comparatively rapid rate for reasons that are unknown. However, there is no observable change in the composition of the reduction product on standing. The catalyst composition is highly active in the presence of ionizing radiation even after standing for long periods of time. Accordingly, in accordance with a preferred form of the present invention, the alpha olefin polymerization reaction is conducted while periodically or continuously irradiating the polymerization medium. In this situation, the intensity of ionizing radiation may be substantially less than that employed in reducing the titanium tetrahalide. Thus, the radiation may have an intensity sufficient to provide an energy input of from about 0.1 to about 50 watthours of radiation per kilogram of suspension. As indicated, the irradiation may be continuous or intermittent. In this latter situation, it is preferable that each of the intermittent periods of irradiation be within the range of about 5 to 30 minutes and that each of the periods between irradiation be within the range of about 5 to 30 minutes.

The polymerization process of the present invention may be conducted at a continuous or a batchwise manner. In any event, there is formed, as a result of the polymerization reaction, a slurry of high molecular weight polymer in the solvent employed in preparing the polymerization catalyst composition. When the polymer is to be recovered, it is necessary to quench the slurry with a compound such as an aliphatic alcohol, an acetonate (e.g., acetyl acetonate), etc. in order to deactivate and substantially completely solubilize the titanium components of the reaction medium. Thereafter, an alpha olefin polymer of very low ash content may be recovered in any suitable manner such as by physical separation (e.g., decantation, centrifugation, etc.). The entire slurry may be quenched in this fashion or, alternatively, a concentrated polymer fraction may be obtained by removing at least a portion of the solvent from the slurry and the thus-concentrated slurry may be quenched in the described manner.

The invention will be further illustrated by the following specific examples which are given by way of illustration and not as limitations on the scope of this invention.

EXAMPLE I

Using an atmosphere of ethane, about 5.1 grams of titanium tetrachloride (3 cm.$^3$) were dissolved in about 400 cm.$^3$ (about 273 grams) of purified n-heptane substantially completely free from oxygen, water, and extraneous compounds having substantial polarity. The resultant clear and colorless solution was cooled to a temperature of about −60° C. in an atmosphere of ethane in a glass flask fitted with an aluminum window 0.003" thick and, while at this temperature, was irradiated with agitation through the window for about 30 minutes with a 20 microampere beam of 2.0 m.e.v. cathode rays obtained from a Van de Graaff generator. This corresponds to the use of about 80 watts of radiation per hour per kilogram of solution. As a result of this treatment, a finely divided precipitate of a titanium compound was formed. At the end of the irradiation period, vaporized ethylene was passed through the irradiated solution for about 1½ hours at the rate of about 470 cm.$^3$ per minute. As a consequence, there was formed a particulate solid polymer of ethylene. At the end of the polymerization run, the mixture was allowed to warm to room temperature and was then quenched with isopropyl alcohol. Detailed characteristics of the polymer obtained by filtration and drying of the quenched polymer are set forth in Table I.

TABLE I

| | |
|---|---|
| Softening point, °C | 115 |
| Melting point, °C | 127 |
| Ash content, wt. percent | 0.13 |
| Intrinsic viscosity (tetralin, 125° C.) | 0.64 |
| Molecular weight (Harris) | 17,000 |
| Percent crystallinity (infra red analysis) | 90 |
| Methyl group content (infra red analysis, methyl groups/100 carbon atoms) | 1 |

EXAMPLE II

Effect of Solvent on Catalytic Activity

A plurality of solutions of titanium tetrachloride in a variety of solvents were irradiated at various temperatures for about 30 minutes with a 20 microampere beam of 2 m.e.v. cathode rays obtained by means of a Van de Graaff generator. In each instance about 400 ml. of solvent was employed. The reduction products that were obtained were tested for catalyst activity with respect to the polymerization of ethylene. The solvents employed, the titanium tetrachloride concentration and irradiation temperature are set forth in Table II, together with results that were obtained.

TABLE II

| Solvent | TiCl$_4$ Conc., Vol. Percent | Irradiation Temperature, °C. | Reduction | Polymerized Ethylene |
|---|---|---|---|---|
| Pentane | 0.75 | 30±5 | Yes | Yes |
| Cetane | 0.75 | 30±5 | Yes | Yes |
| Cyclohexane | 0.75 | 30±5 | Yes | Yes |
| Methylcyclohexane | 0.75 | 30±5 | Yes | No |
| Isooctane | 0.75 | 30±5 | Yes | No |
| Toluene | 0.75 | 30±5 | Yes | No |
| Chlorobenzene | 0.75 | 30±5 | Yes | No |

From Table II it will be noted that reduction of the titanium tetrachloride to a solvent insoluble condition was obtained in all instances. It will be further observed that in the presence of branched aliphatics and aromatics, active polymerization catalysts were not obtained.

EXAMPLE III

Necessity for Employing Titanium Halides

A wide variety of amphoteric metal chlorides were dissolved in n-heptane and irradiated with a 20 microampere beam of 2 m.e.v. cathode rays for periods of time ranging from about 30 minutes to about 1 hour at temperatures ranging from about 60° to about 100° F. In each instance, from about 1 to 2 weight percent solutions of metal compound were employed. In all instances, reduction of the amphoteric metal compound to a solvent insoluble condition was obtained. The resultant suspensions were tested for polymerization activity and, in each instance, were found to be inactive. The unsatisfactory metal compounds that were tested and the radiation conditions employed are set forth in Table III.

TABLE III

| Metal Compound | n-C$_7$, ml. | Temp., °F. | Time |
|---|---|---|---|
| 3 cc. Chromyl Chloride | 300 | 90 | 30 Min. |
| 4 cc. Vanadium Tetrachloride | 300 | 90 | 1 Hour. |
| 4½ Gr. Stannic Chloride | 500 | 75–85 | 1 Hour. |
| 3 cc. Antimony Pentachloride | 350 | 90 | 1 Hour. |

By way of contrast, an active polymerization catalyst is obtained when a solution of 6 grams of titanium tetrabromide in 300 cc. of n-heptane is irradiated at a temperature of 90° to 120° F. for about 20 minutes with a 20 microampere beam of 2 m.e.v. cathode rays. In this instance, a dark brown precipitate is formed which is soluble in methyl alcohol and which can be titrated with ferric chloride.

EXAMPLE IV

Irradiation During Polymerization

To a glass flask provided with an aluminum foil window for the introduction of high energy electrons was added a solution of about 5 grams of titanium tetrachloride in 40 ml. of n-heptane. The solution was irradiated under an atmosphere of helium at a temperature within the range of 60° to 70° F. for about 30 minutes with a 20 microampere beam of 2 m.e.v. cathode rays. As a consequence, a suspension of a brown-colored reduction product in the solvent was obtained. Immediately at the end of the irradiation period, gaseous ethylene was introduced at a charge rate of about 670 cc. per minute. After about 15 minutes of operation, the irradiation was resumed utilizing a 5 microampere beam of 2 m.e.v. cathode rays. The polymerization reaction was conducted for about 2 hours. During the course of the polymerization reaction, white, normally solid, granular polyethylene was obtained. A six-fold increase in yield was obtained in this run as compared with the results obtained in Example I, based on the amount of titanium tetrachloride employed.

EXAMPLE V

To a stainless steel reactor provided with a bladed impeller and an aluminum window for the introduction of cathode rays there was added about 2 ml. of titanium tetrachloride dissolved in 300 ml. of n-heptane. Thereafter, the solution was irradiated while passing gaseous ethylene therethrough. During the initial period of about 25 minutes, the solution was irradiated with a 20 microampere beam of 2 m.e.v. cathode rays and at the end of the 25 minute period the intensity of the beam was reduced to about 5 microampere beams and maintained at this intensity until the end of the experiment. The reaction was conducted at a temperature of 50° to 115° F. Total reaction time was about 3 hours. An eight-fold increase in yield of polyethylene was obtained in this experiment as contrasted with Example IV. This constitutes about a 47-fold increase in yield as compared with Example I. Thus, in this example the polymer yield was equivalent to a yield of about 48 pounds of polyethylene per pound of titanium tetrachloride. With respect to irradiation, a yield of 5 pounds of polyethylene per kw.h. of cathode rays was obtained.

EXAMPLE VI

Active polymerization catalysts are obtainable with types of irradiation other than high energy cathode rays. Thus, for example, active polymerization catalysts have been prepared by irradiating n-heptane solutions of titanium tetrachloride with the unfiltered X-ray spectrum produced by bombarding an iron target with a 10 microampere beam of 45 kilovolt electrons. An active catalyst has also been obtained by irradiating a 5 volume percent solution of titanium tetrachloride in n-heptane with Bremsstrahlung prepared by irradiating a lead target 2 gm. cm.$^{-2}$ thick supported on an aluminum sheet of equal thickness with a 100 microampere beam of 2 m.e.v. cathode rays. As a still further example, an active polymerization catalyst has been prepared by reducing n-heptane solutions of titanium tetrachloride with the gross radiation emanating from a heterogeneous thermal reactor largely fueled with uranium enriched in isotope 235.

EXAMPLE VII

A catalyst composition was prepared by irradiating a solution of 5 cc. of titanium tetrachloride in 500 cc. of n-heptane for about 30 minutes with a 20 microampere beam of 2 m.e.v. cathode rays. Thereafter, propylene was bubbled through the resultant suspension of brown precipitate in n-heptane for about 1 hour at the rate of 60 cm.$^3$ per minute while irradiating with a 20 microampere beam of 2 m.e.v. cathode rays. The experiment was conducted at Dry Ice temperature. At the end of the polymerization run, the polymerization medium was quenched with methyl alcohol and polypropylene was thereafter recovered from the quenched medium. The "G" value for propylene for this experiment was −26 for total propylene consumption.

Having described our invention, what is claimed is:

1. An alpha olefin polymerization catalyst composition comprising a non-polar unbranched aliphatic hydrocarbon solvent containing the solvent insoluble product obtained by irradiating a solution of a titanium halide in said solvent at a suitable temperature with high energy ionizing radiation of an intensity sufficient to generate useful numbers of ion pairs.

2. A catalyst composition as in claim 1 wherein the solvent is a normal paraffin.

3. A catalyst composition as in claim 1 wherein the titanium halide is titanium tetrachloride.

4. A catalyst composition as in claim 1 wherein the solvent is n-heptane and the titanium halide is titanium tetrachloride.

5. A method for preparing alpha olefin polymers which comprises bringing an alpha olefin into contact with a polymerization medium comprising a non-polar unbranched aliphatic solvent having suspended therein the solvent insoluble product obtained by irradiating a solution of a titanium halide in said solvent at a suitable temperature with high energy ionizing radiation of an intensity sufficient to generate ion pairs.

6. A method as in claim 5 wherein the aliphatic solvent is n-heptane.

7. A method as in claim 5 wherein the alpha olefin is ethylene.

8. The method which comprises the steps of preparing about an 0.2 to about 10 weight percent solution of a titanium halide in an unbranched aliphatic solvent, irradiating said solution at a suitable temperature with high energy ionizing radiation of an intensity sufficient to generate ion pairs for a period of time sufficient to reduce said titanium halide to a solvent insoluble precipitate to thereby form a suspension of said precipitate in said solvent, contacting said suspension with an alpha olefin to polymerize said alpha olefin, and thereafter recovering polymerized alpha olefin.

9. A method as in claim 8 wherein the suspension is irradiated with high energy ionizing radiation sufficient to generate useful numbers of ion pairs while said alpha olefin is being contacted therewith.

10. An alpha olefin polymerization catalyst composition consisting essentially of an unbranched saturated aliphatic hydrocarbon solvent containing the solvent insoluble product obtained by irradiating a 0.2 to 10 weight percent solution of a titanium halide in said solvent at a suitable temperature with high energy ionizing radiation of an intensity sufficient to provide an energy input of about 0.5 to about 5000 watt hours of radiation per kilogram of said solution over a period of about 0.1 to about 10 hours, the total energy input being within the range of about 5 to 500 watt hours of radiation per kilogram of solution.

11. A method for preparing alpha olefin polymers which comprises bringing an alpha olefin monomer into contact with a polymerization medium consisting essentially of an unbranched saturated aliphatic hydrocarbon solvent containing the solvent insoluble product obtained by irradiating a 0.2 to 10 weight percent solution of a titanium halide in said solvent at a suitable temperature with high energy ionizing radiation of an intensity sufficient to provide an energy input of about 0.5 to about 5000 watt hours of radiation per kilogram of said solution over a period of about 0.1 to about 10 hours, the total energy input being within the range of about 5 to 500 watt hours of radiation per kilogram of solution.

12. The method which comprises the steps of preparing about a 0.2 to about 10 weight percent solution of a titanium halide in an unbranched saturated aliphatic solvent, irradiating said solution with high energy ionizing radiation to reduce said titanium halide to a solvent insoluble precipitate to thereby form a suspension of said precipitate in said solvent, contacting said suspension of said precipitate in said solvent with an alpha olefin under polymerization conditions to polymerize said alpha olefin and thereafter recovering said polymerized alpha olefin, said ionizing radiation being sufficient to provide an energy input of about 0.5 to about 5000 watt hours of radiation per kilogram of said solution over a period of about 0.1 to about 10 hours, the total energy input being within the range of about 5 to 500 watt hours of radiation per kilogram of solution.

13. A process for the polymerization of a normally gaseous n-alkene to produce a normally solid thermoplastic polymer, which process comprises contacting said alkene with a catalytic system consisting essentially of a solvent insoluble compound of titanium prepared by subjecting a solution of a compound of titanium in a nonpolar unbranched aliphatic hydrocarbon solvent to an ionizing radiation dose sufficient to generate useful numbers of ion pairs, and recovering a polymer thus produced.

14. The process of claim 13 wherein said compound is a salt.

15. The process of claim 13 wherein said alkene is ethylene.

16. The process of claim 13 wherein said alkene is propylene.

17. The process of claim 13 wherein said radiation is gamma radiation.

18. The process of claim 13 wherein said radiation is beta radiation.

References Cited in the file of this patent
UNITED STATES PATENTS 2,903,404    Oita et al. _____ Sept. 18, 1959